United States Patent [19]

Foreman

[11] 4,396,439

[45] Aug. 2, 1983

[54] RECOVERY AND RECYCLE OF NITRATE AND NITRITE SALTS FROM CHLORIDE CONTAINING QUENCH BATH SOLIDS

[75] Inventor: Robert W. Foreman, Bloomfield Hills, Mich.

[73] Assignee: Park Chemical Company, Detroit, Mich.

[21] Appl. No.: 294,965

[22] Filed: Aug. 21, 1981

[51] Int. Cl.$^3$ ............................................... C21D 1/48
[52] U.S. Cl. ...................................... 148/15; 148/18; 148/20; 148/27
[58] Field of Search ....................... 148/18, 15, 20, 27; 423/300

[56] References Cited

U.S. PATENT DOCUMENTS

| | | | |
|---|---|---|---|
| 3,953,248 | 4/1976 | Coch | 148/18 |
| 3,966,508 | 6/1976 | Mohr | 148/18 |
| 4,158,579 | 6/1979 | Foreman et al. | 148/20 |

*Primary Examiner*—Veronica O'Keefe
*Attorney, Agent, or Firm*—Krass, Young & Schivley

[57] ABSTRACT

A method is provided for the recovery and recycle of nitrate and nitrite salts present in environmentally hazardous chloride containing quench bath solids, comprising the steps of leaching the solids with hot water to provide an aqueous leachate that depletes the hot water soluble content of the solids, clearing the resulting aqueous leachate of solids, and recycling it while hot into a fused quench bath.

15 Claims, No Drawings

RECOVERY AND RECYCLE OF NITRATE AND NITRITE SALTS FROM CHLORIDE CONTAINING QUENCH BATH SOLIDS

DESCRIPTION

1. Technical Field

This invention relates to a method for the recovery and recycle of nitrate and nitrite salts present in environmentally hazardous chloride containing quench bath solids. In particular, the invention relates to a method comprising the steps of leaching the quench bath solids with hot water to provide an aqueous leachate that depletes the hot water soluble content of the solids, clearing the resulting aqueous leachate of solids, and recycling it while hot into a fused quench bath.

2. Background Art

Commercial hardening techniques for ferrous metal objects or workpieces typically involve sequencing the objects batchwise through a high heat treatment, a quench, and one or more rinses. In particular, these involve heating the objects in a high heat (e.g., 1500°–1700° F.) bath of neutral molten salt such as chloride (especially NaCl and KCl), and quenching the heated objects in another, less hot (e.g., 350°–700° F.) molten agitated isothermal salt bath or quench bath, such as a bath of nitrate and nitrite salts, e.g., a mixture of sodium nitrate, potassium nitrate and sodium nitrite salts. Thus, a certain amount of the chloride salt is transferred on each object by drag-out from the high heat bath to the quench bath; for a description of a similar drag-out into rinse water, see U.S. Pat. No. 4,158,579. The chloride salt which is dragged out is soluble in nitrate salt in amounts that are below the chloride saturation point. As the latter point is reached, however, further amounts of chloride salt dragged into the quench bath will fail to dissolve and will start to precipitate as a solid. This extra salt cannot be absorbed by the bath salts and will be left in suspension or will form as sludge or solidified salt in the bath. Sludge buildup or solidified salt must be removed from the bath since it adversely affects quenching activity and efficiency. For example, whereas 4% by weight of sodium-potassium chloride salts in a given nitrate-nitrite salt bath equates with saturation at a temperature of 400° F., a content of 24% chloride salts for the same bath that is saturated and solid free can exist only at temperatures above 800° F. Sludge and solid removal from the bath may be accomplished manually by scrapers, ladles and the like or automatically by filtering bath-suspended solids under agitation through fine screen baskets which when about half full of solids, are periodically removed, drained, emptied, and reinstalled. The thus discarded solids constitute an economic loss since they contain potentially valuable nitrates, yet by reason of their high nitrate and nitrite content, the solids (especially if disposed of with combustible waste) are regarded as fire- and explosion-hazardous waste under Federal law (45 F.R. 33066-33588, Resource Conservation and Recovery Act). Treatment, storage, and disposal of the hazardous waste therefore dictate adherence, at substantial added cost, to specially prescribed safety standards. A further aspect of the storage and handling problem is that the waste solids when first removed from the bath are pourable but, when cooled, quickly set up into hard, rock-like masses that are difficult to break up and convert to smaller, manageable particulates.

It is therefore an object of the present invention to provide means for efficient recovery and recycle of quench bath waste solids and sludges.

It is a further object of the invention to recover the nitrate and nitrite values from quench bath waste solids.

It is another object to avoid the high cost of treatment, storage, and disposal of hazardous quench bath waste solids.

It is still another object to convert rock-like quench bath solids to a friable substance that can be easily crushed and disposed of in an environmentally safe liquid or solid form.

These and other objects, features, and advantages of the invention will be realized from the following detailed description of the invention.

SUMMARY AND DETAILED DESCRIPTION

The invention in one aspect provides a process for the recovery and recycle of nitrate and nitrite salts present in chloride containing quench bath solids, comprising the steps of leaching the solids with hot water under conditions such as to provide an aqueous leachate that depletes the hot water soluble content of the solids, clearing the resulting aqueous leachate of residual or leached solids, and delivering the leachate while hot into a fused quench bath. The process serves not only to selectively recover valuable nitrate and nitrite values but also to sharpen the quench and restore moisture to the bath in which the values are recycled and to convert the unwanted rock-like quench bath solids into a friable, environmentally safe residual substance for economic disposal in a solid form or in a liquid form obtained by dissolving in water.

In another aspect the invention provides a process for the handling of chloride containing solids separating in a nitrate based quench bath, comprising the steps of removing the solids from the bath, cooling and comminuting the solids, leaching the resulting solids with hot water to obtain an aqueous leachate that raises the chloride content of the solids above about 80% by weight, clearing the resulting leachate of residual solids, and recycling the leachate while hot into a quench bath.

The process of the invention is broadly applicable for the recovery and recycle of nitrate and nitrite salts present in chloride containing nitrate based quench bath solids. The term "chloride containing nitrate based quench bath solids" as used herein means solids or sludges obtained by recovering and cooling the solids, in any suitable way, from one or more chloride contaminated nitrate based (that is, nitrate, nitrite, or nitrate-nitrite based) fused quench baths. An illustrative example of such a bath is a contaminated quench bath based on sodium and potassium nitrates and sodium nitrite and/or potassium nitrite. The manner of desludging and cooling is conventional and does not form a part of the invention. The leaching step is subject to wide variation in conditions relative to type of equipment used, water/solids ratio, solids particle size, water temperature, leaching time, and extent of agitation of the leaching mixture. For leaching, one may conveniently use a single-batch capacity tank, preferably inox steel, or glass or inert plastic lined, equipped with a heater, an agitator, and filter outlet leading to an optional holding tank (with heating means) and delivery line adapted to recycle hot leach water at controlled rate for the replenishment of nitrate and nitrite salts to one or more operating fused quench baths. The leaching water is suitably employed in the amount of at least about 0.3 part by weight of water per part of solids under conditions such that the nitrate and nitrite content present in the solids is depleted below about 20% by weight or in order words the chloride salt content is raised above about 80% by weight. The latter solids, thus depleted of nitrate and nitrite content below the mentioned content, are deemed to be environmentally safe for disposal by conventional methods. The leaching water in one preferred embodiment is employed in an amount ranging from about 0.3 to about 0.8 and more preferably about 0.4 to about 0.5 part by weight for each part by weight of solids processed. Water can be used in excess and the leach kept boiling under evaporation until the proper water solids ratio is achieved. The endpoint can be determined by suitable means such as a hygrometer. Hot water, that is water at about 120° F. temperature, preferably at least 180° F. and for best results at or near the boiling point (which typically may be about 220° F.) of the leach mixture, is used for leaching. The solids or particulates, for purposes of leaching, should be about one inch in dimension or finer, obtained if necessary by breaking, crushing, triturating, or grinding larger masses or particulates, in any suitable way. Leaching is usually continued until a substantially steady state solution or endpoint is achieved, which typically may require about one hour. Clearing of the leachate from residual solids can be accomplished in any suitable way such as by sedimentation or filtering. Filtering under vacuum or under pressure is preferred. Agitation of the leaching mixture may be conveniently provided by air bubbler, propeller means or mixer blades or other suitable means affording efficient liquid-solid contact. The clarified leachate, free of residual solids, is recycled, while hot or equivalently after first cooling and then reheating, to the quench bath in any suitable way. For the purpose, the leachate is recycled, through a nozzle or other suitable means, to a vortex or point of good agitation in the fused bath at a rate such that water concentration and uniformity of quench severity are maintained yet without undue spraying or splattering of the water and salt. Recycling sufficient to give about ½ to 2% water at 400° F. bath temperature is recommended (½ to 1% at 500° F., ¼ to ½% at 600° F., ¼% at 700° F.).

The invention and the manner and best means of practicing the same are illustrated by the following examples.

EXAMPLE 1

A 1-Kg. batch of chloride containing nitrate based waste quench bath solids, in chunk form about ¾ inch or finer, obtained by desludging, cooling, and grinding, having the following sample composition:

| Component | grams |
|---|---|
| sodium chloride | 184.4 |
| potassium chloride | 174.0 |
| sodium nitrate | 85.8 |
| potassium nitrate | 354.5 |
| sodium nitrite | 201.3 | and 524 g. of water were charged to a 3500-cc. glass container with stainless metal cover to condense and recover steam. The mixture was boiled with ambient convective mixing at 240° F. (for about one hour) until the water content was reduced to 474 g. The mix was vacuum filtered using a large Buchner funnel and No. 41 filter paper. The content of the filtrate and residual solids (residue) analyzed respectively as follows:

| | Content, Grams | |
|---|---|---|
| | Filtrate | Residue |
| Sodium chloride | — | 184.4 |
| Potassium chloride | 155.1 | 18.9 |
| Sodium nitrate | 79.2 | 6.6 |
| Potassium nitrate | 338.0 | 16.5 |
| Sodium nitrite | 191.4 | 9.9 |

The recovery of nitrate and nitrite salts from the waste solids when, as specified above, the filtrate is recycled while hot to the quench bath is the following:

| Component | Recovery |
|---|---|
| Sodium nitrate | 90% |
| Potassium nitrate | 95% |
| Sodium nitrite | 95% |

Prior to processing, the waste solids were classified as hazardous waste, were rock-like and difficult to crush, and contained by weight 35.8% chloride salts and 64.2% nitrate and nitrite salts. By contrast, the residual solids obtained by the described process were surprisingly quite friable or crushable even by hand (being measurably superior to untreated waste solids in this respect) and were environmentally safe for disposal either as solid waste or in solution as drainable liquid waste. The residual solids contained 86% chloride salts and 14% nitrate and nitrites. These results therefore demonstrate that the instant method is surprisingly effective at low cost for recovering and recycling valuable nitrate and nitrite salt values for quench bath purposes and for converting unwanted hazardous waste solids to safe substances which can be disposed of economically by conventional means.

Additional runs using the procedure of Example 1 and illustrating recovery from other waste solid materials and conditions of operation are summarized as follows:

| Supplementary Examples | Waste Solid Composition* (143.2 g.) | Water Solids Ratio (Parts by Weight) | Leaching Temp. | Particle Size | Leaching Time | Residue Recovered (grams) | Residual Chloride Content (Wt. %) |
|---|---|---|---|---|---|---|---|
| 2. | Composition I | 0.70 | 220° F. | 1 inch. & finer | ca. 1 hr., mechanical stirrer | 29.3 | 99 |
| 3. | Composition I | 0.52 | 220° F. | 1 inch. & finer | ca. 1 hr., mechanical | 55.7 | 82.6 |

| | | | | | -continued | | |
|---|---|---|---|---|---|---|---|
| 4. | Composition I | 0.61 | 220° F. | 1 inch. & finer | ca. 1 hr., mechanical stirrer | 37.0 | — |
| 5. | Composition I | 0.45 | 220° F. | 1 inch. & finer | ca. 1 hr., mechanical stirrer | 53.6 | 85.9 |
| 6. | Composition II | 0.52 | 220° F. | 1 inch. & finer | ca. 1 hr., mechanical stirrer | 15.7 | 92.6 |
| 7. | Composition II | 0.42 | 220° F. | 1 inch. & finer | ca. 1 hr., mechanical stirrer | 22.0 | 95.2 |
| 8. | Composition II | 0.31 | 220° F. | 1 inch. & finer | ca. 1 hr., mechanical stirrer | 31.5 | 86.6 |
| 9. | Composition II | 0.70 | 230° F. | 1 inch. & finer | ca. 1 hr., mechanical stirrer | 29.2 | 94.6 |
| 10. | Composition II | 0.45 | 230° F. | 1 inch. & finer | ca. 1 hr., mechanical stirrer | 50.1 | 87.9 |

| | Component % By Weight | | | | |
|---|---|---|---|---|---|
| | $NaNO_3$ | $KNO_3$ | $NaNO_2$ | NaCl | KCl |
| *Composition I | 11.8 | 29.7 | 17.8 | 20.3 | 20.3 |
| Composition II | 15.9 | 39.8 | 23.9 | 10.2 | 10.2 |

These results show that the process of the invention serves effectively for the recovery and recycle of nitrate and nitrite salt values from different types of hazardous waste quench bath solids containing relatively high percentages of such salt values. The results also show that the residual solids obtained are environmentally safe for disposal by conventional solid and liquid waste disposal techniques.

The embodiments of the invention in which an exclusive property or privilege is claimed are defined as follows:

1. A process for the recovery and recycle of nitrate and nitrite salts present in chloride containing quench bath solids in the form of difficultly breakable environmentally hazardous, rock-like masses, comprising the steps of leaching the solids with hot water to provide an aqueous leachate that depletes the hot water soluble content of the solids, clearing the resulting aqueous leachate of residual solids, delivering the leachate while hot into a fused quench bath, and recovering the residual material in the form of hand-crushable solids that are environmentally safe for disposal.

2. A process according to claim 1 where the solids are leached with hot water in the amount of at least about 0.3 part by weight of water per part by weight of solids under conditions such that the nitrate and nitrite content present in the solids is depleted below about 20% by weight.

3. A process according to claim 2 where the leaching step is carried out at the boiling point of the leaching mixture.

4. A process according to claim 2 where the leaching step is carried out for at least one hour.

5. A process according to claim 2 where the partical size of the solids subjected to leaching is about one inch or finer.

6. A process according to claim 2 where the amount of hot water is in the range from about 0.3 part to about 0.8 part per part of solids.

7. A process according to claim 1 where the solids contain sodium chloride and potassium chloride and the solids are leached with hot water in the amount of at least about 0.3 part by weight of water per part by weight of solids under conditions such that the chloride salt content of the solids is raised above about 80% by weight.

8. A process according to claim 7 where the leaching step is carried out at the boiling point of the leaching mixture.

9. A process according to claim 7 where the leaching step is carried out for at least one hour.

10. A process according to claim 7 where the particle size of the solids subjected to leaching is less than about one inch.

11. A process according to claim 1 where the leachate is filtered while hot.

12. A process according to claim 11 where the filtered leachate is delivered into the quench bath directly after filtering.

13. A process for the handling of chloride containing environmentally hazardous solids separating in a nitrate based quench bath, comprising the steps of removing the solids from the bath, cooling and comminuting the solids, leaching the resulting comminuted solids with hot water to obtain an aqueous leachate that raises the chloride content of the solids above about 80% by weight, clearing the resulting leachate while hot into a quench bath, and recovering the residual material in the form of hand-crushable solids that are environmentally safe for disposal.

14. A process according to claim 13 where the solids contain nitrate and nitrite salts and the solids are leached with hot water in the amount of at least about 0.3 part by weight of water per part by weight of solids for a time sufficient to lower the nitrate and nitrite content of the solids below 20% by weight.

15. A process according to claim 13 where the solids contain sodium chloride and potassium chloride and the solids are leached with hot water in the amount of at least about 0.3 part by weight of water per part by weight of solids for a time sufficient to raise the sodium chloride and potassium chloride content of the solids to more than 80% by weight.

* * * * *

UNITED STATES PATENT AND TRADEMARK OFFICE
CERTIFICATE OF CORRECTION

PATENT NO. : 4,396,439

DATED : August 2, 1983

INVENTOR(S) : Robert W. Foreman

It is certified that error appears in the above-identified patent and that said Letters Patent are hereby corrected as shown below:

Column 5, Item 9 (in the table) "Composition II"

should read --Composition I--.

Column 5, Item 10 (in the table) "Composition II"

should read --Composition I--.

Signed and Sealed this

First Day of November 1983

[SEAL]

Attest:

Attesting Officer

GERALD J. MOSSINGHOFF

Commissioner of Patents and Trademarks